United States Patent
Karlsson et al.

(10) Patent No.: US 8,960,617 B2
(45) Date of Patent: Feb. 24, 2015

(54) SUSPENSION DEVICE FOR VEHICLE

(75) Inventors: Pär Karlsson, Nyköping (SE); Ulric Karlsson, Tullinge (SE)

(73) Assignee: Scania CV AB (SE)

( * ) Notice: Subject to any disclaimer, the term of this patent is extended or adjusted under 35 U.S.C. 154(b) by 155 days.

(21) Appl. No.: 13/583,865

(22) PCT Filed: Apr. 6, 2011

(86) PCT No.: PCT/SE2011/050408
§ 371 (c)(1),
(2), (4) Date: Sep. 10, 2012

(87) PCT Pub. No.: WO2011/126443
PCT Pub. Date: Oct. 13, 2011

(65) Prior Publication Data
US 2013/0001384 A1    Jan. 3, 2013

(30) Foreign Application Priority Data

Apr. 8, 2010  (SE) .................................. 1050345

(51) Int. Cl.
| | | |
|---|---|---|
| A47B 96/00 | (2006.01) | |
| A47K 1/00 | (2006.01) | |
| E04G 5/06 | (2006.01) | |
| F16L 3/08 | (2006.01) | |
| F21V 21/00 | (2006.01) | |

(52) U.S. Cl.
USPC .................................. 248/222.14; 248/224.8

(58) Field of Classification Search
USPC .......... 248/222.14, 224.8, 313, 154; 222/609, 222/181.1; 141/95, 94
See application file for complete search history.

(56) References Cited

U.S. PATENT DOCUMENTS

| | | | | |
|---|---|---|---|---|
| 1,940,888 | A | * | 12/1933 | Smith ...................... 248/222.14 |
| 3,188,038 | A | * | 6/1965 | Grout ....................... 248/222.14 |
| 5,590,819 | A | * | 1/1997 | Armstrong .................... 222/609 |
| 5,810,309 | A | * | 9/1998 | Augustine et al. ............ 248/313 |

FOREIGN PATENT DOCUMENTS

| | | |
|---|---|---|
| DE | 20 2007 009 069 | 10/2007 |
| DE | 10 2006 051 390 | 4/2008 |
| EP | 0 872 372 | 10/1998 |

(Continued)

OTHER PUBLICATIONS

International Search Report dated Jul. 6, 2011 issued in corresponding International patent application No. PCT/SE2011/050408.

(Continued)

*Primary Examiner* — Amy J. Sterling
(74) *Attorney, Agent, or Firm* — Ostrolenk Faber LLP

(57) ABSTRACT

A suspension device or bracket (3,19) for releasable fitting of one device to another at a vehicle, and having one bracket part (4,5,21a,21b) mounted on a vehicle and another one on the device to be connected to the vehicle. One locking element (6,20a,20b) being fitted to be activated from one side of the suspension device (3,19), and the other locking element (6,20a,20b) being fitted to be activated from the other side of the suspension device (3,19), the suspension device (3,19) being so arranged that only one locking element (6,20a,20b) need be released to take the suspension device (3,19) apart, irrespective of which locking element (6,20a,20b) is released.

9 Claims, 4 Drawing Sheets

(56) References Cited

FOREIGN PATENT DOCUMENTS

| | | |
|---|---|---|
| EP | 1 132 248 | 9/2001 |
| EP | 2 130 747 | 12/2009 |
| GB | 2 388 153 | 11/2003 |

OTHER PUBLICATIONS

International Preliminary Report on Patentability dated May 21, 2012 issued in corresponding International patent application No. PCT/SE2011/050408.

* cited by examiner

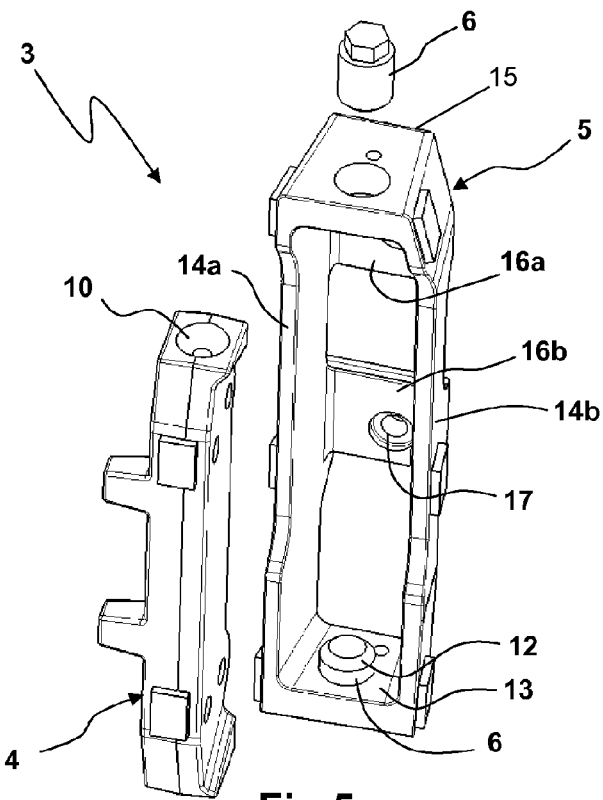
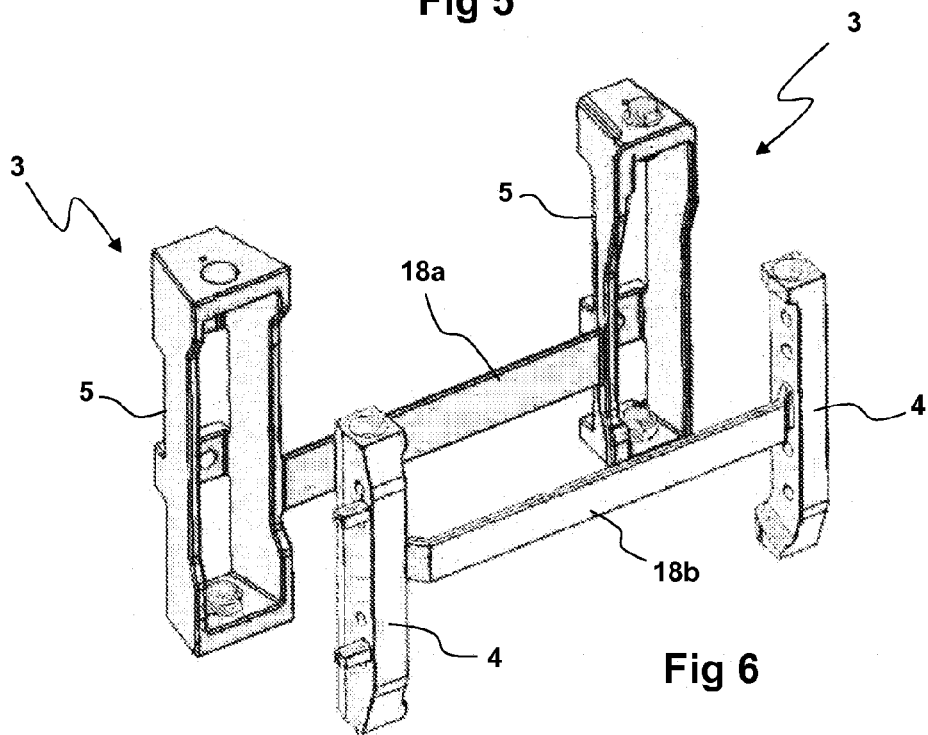

SUSPENSION DEVICE FOR VEHICLE

CROSS-REFERENCE TO RELATED APPLICATIONS

The present application is a 35 U.S.C. §§371 national phase conversion of PCT/SE2011/050408, filed Apr. 6, 2011, which claims priority of Swedish Application No. 1050345-6, filed Apr. 8, 2010, the contents of which are incorporated by reference herein. The PCT International Application was published in the English language.

TECHNICAL FIELD

The present invention relates generally to suspension devices for releasable fitting of various units and components. The invention relates in particular to a suspension device which facilitates and speeds up the fitting of, for example, silencers and/or tanks on a motor vehicle such as a truck. The invention relates particularly to speeding up the assembly of the vehicle and facilitating and speeding up the removal of various components on the occasion of subsequent repairs and maintenance work.

STATE OF THE ART

In many different contexts it is necessary to be able to fit and remove various components in a quick, effective and ergonomic way. This applies not least in the manufacture of heavy/commercial motor vehicles. During the manufacture and production of, for example, trucks it is desirable to simplify and speed up manufacturing operations in order to achieve more cost-effective manufacture. This may be done inter alia by assembling the more complex units off the production line, e.g. at so-called preassembly stations, in order thereafter to be able to fit these units more quickly on the vehicle at the various fitting stations on the production line. During manufacture it is desirable that certain of these units, particularly those which are heavy and bulky, should be fitted from above, inter alia to achieve ergonomic working positions. Examples of this are silencers, fuel tanks etc. which can thus be fitted from above when superstructures have not yet been fitted on the vehicle. On the occasion of subsequent maintenance and service operations on the vehicle, or replacement of such fitted units, they have to be removed from below because superstructures, e.g. bodywork and the like, limit or completely prevent access from above. This creates problems in that the brackets used in the original fitting from above may be difficult or time-consuming to dismantle from below.

Attempts have previously been made to create brackets which facilitate both fitting and subsequent dismantling.

Patent specification EP1132248 refers for example to a suspension device or a bracket for a container, e.g. a tank for fitting on a truck. The tank is provided at the top with a ductlike element positioned above a support situated in the bracket which is itself mounted on the side of a beam of the truck. At the bottom, the tank is provided with an element which, during the assembly process, fits into a recess in the lower part of the bracket. This provides assurance that the tank cannot jump out of its bracket when the vehicle is in motion. However, this solution is not sufficiently simple and flexible to be assembled entirely from above or dismantled entirely from below, since a crucial screw connection is situated at the bottom of the lower part of the bracket and of the tank. This solution also requires enough space above the tank to enable it to be hoisted during dismantling, i.e. be raised a certain distance so that the ductlike element can be unfastened from the support in the upper part of the bracket.

Patent specification DE102006051390 refers to an alternative suspension device, e.g. for fuel tanks, and comprises flat-shaped male and female parts, one of them mounted on the vehicle and the other on the unit, the tank, which is to be fitted on the vehicle. The assembly process involves the parts being fitted into one another and moved somewhat sideways so that a plurality of protrusions of the one, the male part, are pushed into a corresponding number of grooves in the other, the female part. To prevent the bracket from coming apart when the vehicle is in motion, one or more screws or bolts are screwed through the male and female parts in such a way that these parts are locked to one another. In the example depicted, this threaded connection is situated at the top of the bracket. This solution is likewise not simple and flexible enough to be assembled or dismantled entirely from above or entirely from below, since a threaded connection is situated at the top of the upper part of the bracket and of the tank and has to be unfastened to make it possible to separate the parts of the bracket.

The construction of known suspension devices is therefore not such as to effectively combine a good, quickly assembled and safe bracket with the simplicity of the option of being able to assemble and dismantle it from two directions, e.g. from above and from below.

SUMMARY OF THE INVENTION

An object of the invention is to solve the problem indicated above and propose a suspension device or a bracket which facilitates and speeds up the fitting of, for example, various components of a vehicle during its manufacture and which facilitates and speeds up their removal on the occasion of subsequent maintenance and service operations.

Another object of the invention is that the suspension device should make it easy to fit units and components to the vehicle from above and subsequently to remove them from below. The opposite should of course also be possible.

A further object of the invention is that the various constituent parts of the suspension device should be of simple construction and therefore inexpensive to manufacture but also be robust enough to withstand large stresses and loads.

These and further objects and advantages are achieved according to the invention by a suspension device configured in accordance with the invention.

The invention therefore relates to a suspension device or a bracket for releasable fitting of various units and components on, for example, a vehicle. It may be used to fit, for example, heavy and bulky silencers, fuel tanks or similar components on a truck. The invention facilitates and speeds up fitting during the manufacture of the vehicle and also makes quick and easy removal possible on the occasion of subsequent repair and maintenance operations.

The suspension device or bracket according to the invention comprises two main parts, one of them mounted on the truck and the other on the unit which is to be releasably fitted on the truck. In cases where the unit is to be finally fitted on the truck, the two parts of the bracket are brought together and may be locked to one another from above or from below, as desired. Fitting involves one locking element being screwed into one of the two parts of the bracket, either at the top or at the bottom, followed by the other part of the bracket being brought together with the first part and by the other locking element being screwed into the bracket. As previously mentioned, the locking elements are partly cone-shaped and at the locking stage they clamp the two main parts of the bracket firmly to one another. The construction according to the invention means that the bracket can be both locked and released from two directions, e.g. from above or from below, irrespective of the direction and sequence in which the locking elements are initially put together.

The suspension device or bracket is defined in that one locking element is adapted to being fitted or activated, from one side of the bracket, preferably from above, and the other locking element is adapted to being fitted or activated, from the other side of the bracket, preferably from below, and the bracket is so arranged that only one of the locking elements need be released to make it possible to take the bracket apart, and the bracket is so arranged that it is taken apart and the assembled parts are separated irrespective of which locking element is released.

The primary advantages of the suspension device according to the invention are the short fitting time and the fact that the bracket can be finally assembled and released as desired, both from above and from below, irrespective of whether the bracket is originally assembled and locked from above or from below. The possibility of fitting from above is an advantage in usually resulting in a better ergonomic working position. Assembling the bracket is also simple in only involving two locking elements being screwed in or being activated. The locking elements may be preassembled, but not fully tightened, before the two main parts of the bracket are brought together.

The state of the art entails using and screwing in significantly more screws or bolts. In the case of a truck being fitted with a silencer, it is normally not possible to reach the upper screws by which the silencer is fitted, once the truck has been finally assembled and has been fitted with bodywork or the like which covers these locking elements. The removal of a silencer as necessary at various service intervals is made possible according to the invention by the lower locking element being released/unscrewed, making it possible for the bracket to be taken apart and making it easy to free the silencer.

Further features and advantages of the invention are indicated by the more detailed description of the invention set out below and the attached drawings and other claims.

BRIEF DESCRIPTION OF THE DRAWINGS

The invention is described in more detail below in some examples of preferred embodiments with reference to the attached drawings.

FIG. 5 depicts in perspective the bracket and its constituent parts, viz. a male part, a female part and two threaded elements, one of them unfastened and one fitted in the male part.

FIG. 6 shows how the bracket according to the invention may be used and be grouped in pairs by means of fixing elements.

DESCRIPTION OF PREFERRED EMBODIMENTS

The invention relates to a suspension device or bracket for releasable fitting of various units and components to, for example, a vehicle. The invention facilitates and speeds up the fitting, during manufacture of the vehicle, and the removal, on the occasion of subsequent repair and service operations, of the units and components fitted by means of the invention, e.g. silencers and/fuel tanks etc. on a truck. The bracket according to the invention can be assembled or dismantled, i.e. separated or taken apart, from two directions, e.g. from above or from below if the bracket is used on a vehicle.

Figure 1:
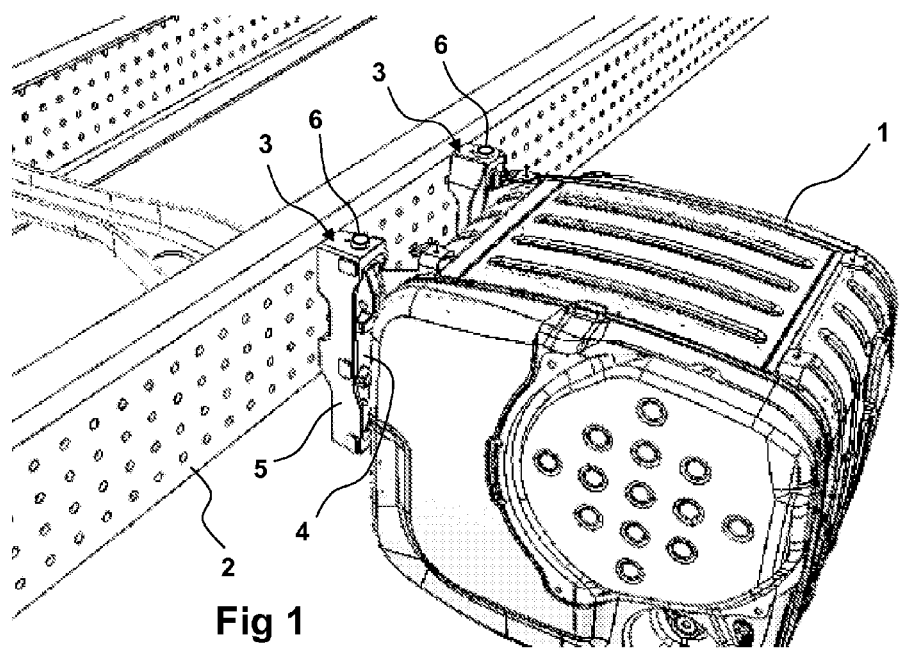
FIG. 1 depicts a view obliquely from above and from the side of a silencer unit fitted to one of a truck's two load bearing longitudinal beams by means of two bracket brackets according to the invention.

FIG. 1 depicts a view obliquely from above and from the side of a silencer 1 fitted to a beam 2 on a truck (not depicted). The fitting has been done by means of two suspension devices or brackets 3 according to the invention placed side by side at a certain distance from one another. Each bracket 3 comprises a male part 4 and a female part 5. In the diagram, the female parts 5 are fastened to the beam 2 and the male parts 4 to the silencer 1. The male parts 4 are substantially fully inserted in the interior hollow/space of the female parts 5 and are firmly locked therein by means of threaded locking elements 6, preferably with cone-shaped end portions.

Figure 2:
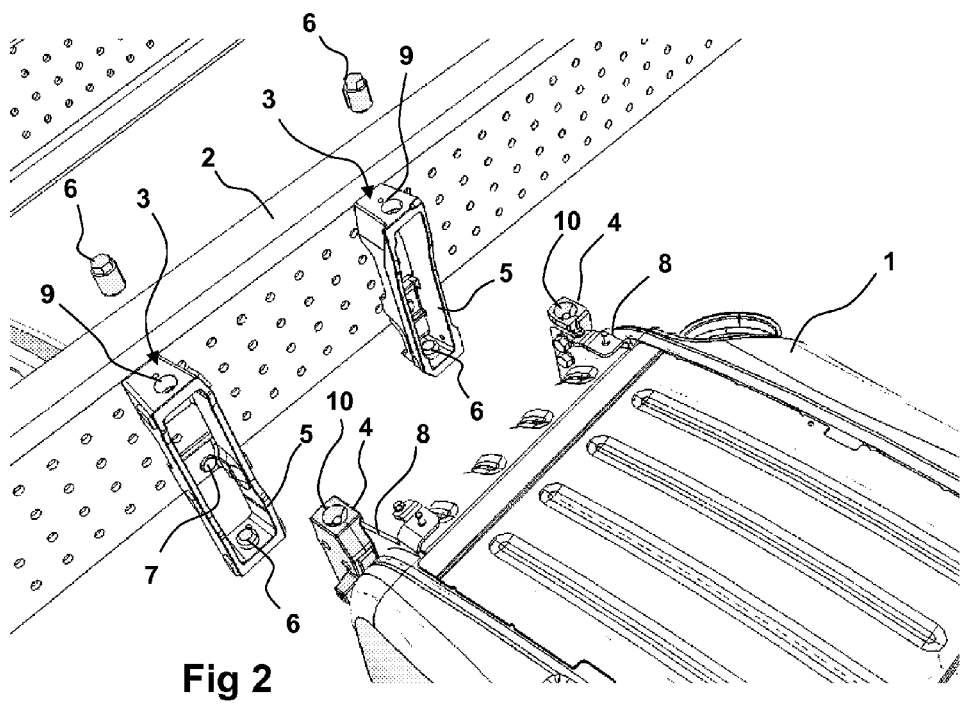
FIG. 2 depicts a similar view to FIG. 1 but with the silencer released from the beam, i.e. with the two brackets taken apart and separated from one another.

FIG. 2 depicts the brackets 3 according to FIG. 1 but in an unfastened, separated, state. The female parts 5 of brackets 3 are fitted to the truck beam 2 by means of, for example, screws or bolts 7, and the male parts 4 of the brackets 3 are screwed firmly to the silencer 1 by means of specially designed fitments 8. Threaded locking elements 6, screws or bolts, with tapered outer ends, are fitted in the lower portion of the female part 5 in such a way that the cone-shaped end is directed upwards and into the internal hollow space of the female part 5. Threaded holes 9 are provided at the top and bottom of the female part 5 for screwing in of locking elements 6. Fitting the silencer 1 against the truck beam 2 involves the male parts 4 of the brackets 3 being moved into the female parts 5 and then lowered somewhat towards the prefitted lower locking elements 6 in such a way that the lower locking elements 6 meet and fit into cone-shaped recesses 10 provided in the lower end portions of the male parts 4. When the male parts 4 are pushed into place, the upper cone-shaped locking elements 6 are screwed down in the threaded holes 9 of the female parts 5 so that the tapered end portions of the upper locking elements 6 meet and are accommodated in the likewise cone-shaped upper recesses 10 of the male parts 4.

Figure 3:
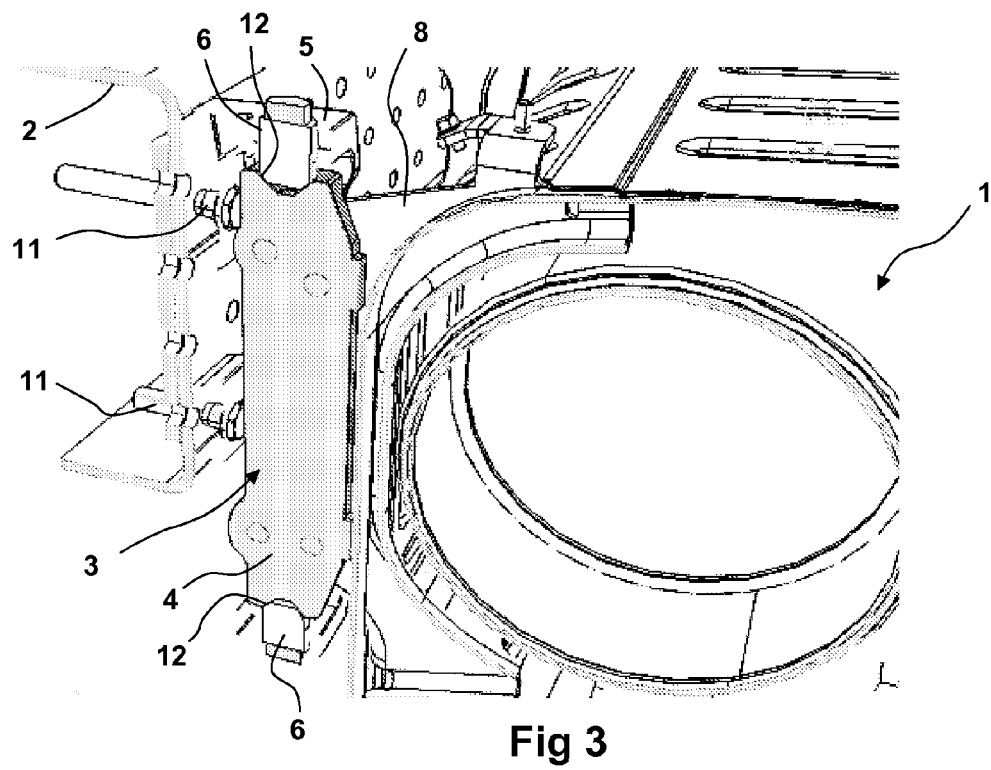
FIG. 3 depicts, partly in cross-section, a bracket according to the invention in an assembled state.

FIG. 3 depicts in more detail, and partly in cross-section, a bracket 3 according to the invention in a fitted state. Two bolts or screws 11 hold the female part 5 firmly against the beam 2 and a fitment 8 keeps the male part 4 fastened to the outer casing of the silencer 1. Upper and lower locking elements 6, each preferably a screw with threads and with a cone-shaped end portion 12, are screwed into the female part 5 in such a way that at least the cone is accommodated in purpose-made and preferably cone-shaped recesses 10 in the respective upper and lower end portions of the male part 4.

Figure 4:
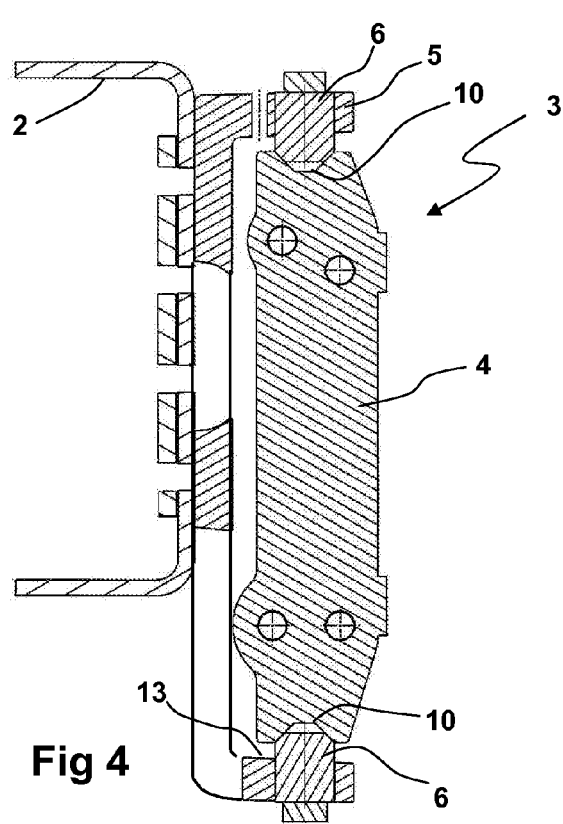
FIG. 4 depicts a bracket according to the invention in more detail and in cross-section.

FIG. 4 depicts a bracket 3 according to the invention in more detail and in cross-section. The female part 5 of the bracket 3 is here shown fitted to the truck beam 2. The male part 4 of the bracket, which is fastened to the unit which is to be fitted to the beam 2, in this case the silencer 1 (not depicted), is introduced into the inner space of the female part 5, and its upper and lower cone-shaped recesses 10 rest against corresponding upper and lower locking elements 6, with cone-shaped end portions which are screwed in so that they lock and clamp the male part 4 firmly in the female part 5. The male part 4 may be released and dismantled from the female part 5 by the upper or the lower locking element 6 being unscrewed or released, i.e. the removal of the silencer 1 from the truck beam 2 may be done either from above or from below, depending on whether some other vehicle part is fitted in such a way that removal of the silencer 1 is made difficult or prevented in one direction or the other. If the lower locking elements 6 are released, the male parts 4 will initially rest against the inner lower bottom portion 13 of the female parts 5, after which the bracket 3 can easily be taken apart/separated and the silencer 1 released from the beam 2.

FIG. 5 depicts the main parts of the bracket 3, viz. the male part 4, the female part 5 and the two threaded locking elements 6 with cone-shaped end portions 12, one locking element 6 being shown fitted in the lower portion, the bottom portion 13, of the female part 5. The female part 5 is made of, for example, metal and is provided with side portions 14*a,b*, a bottom portion 13, a top 15 and two rear plates, 16*a,b*, provided with holes 17 for fastening screws. The male part 4 is also preferably made of metal and comprises mainly a solid body with cone-shaped recesses 10 situated at the top and bottom.

FIG. 6 shows two brackets 3 joined together by spacing elements 18*a,b* made for example from flat iron or from a similar sheet metal fitment, which keep the brackets 3 fixed in pairs relative to one another and facilitate correct and exact fitting of the parts, to minimise subsequent adjustment work and provide assurance that the male and female parts fit into one another.

Figure 7:
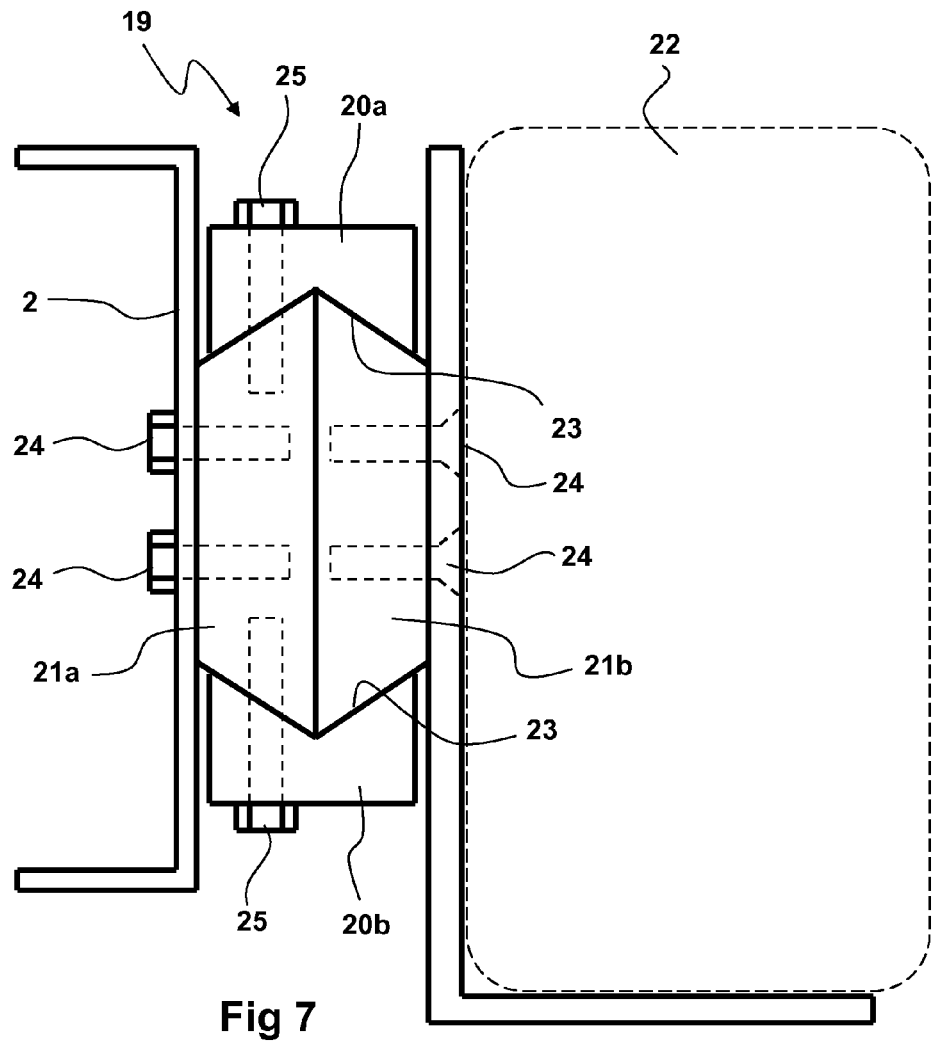
FIG. 7 depicts an alternative embodiment of a bracket according to the invention.

FIG. 7 depicts an alternative embodiment of a suspension device or bracket 19 which can be fitted or removed, separated/taken apart, from two directions, e.g. from above or from below if it is used on a vehicle. The bracket 3 substantially comprises two independent threaded connections or locking elements 20*a,b* which make it possible to fit and remove the bracket 19 from both above and below a vehicle. The bracket 19 comprises first and second cross-sectionally cone-shaped elements 21*a,b* locked to one another by upper and lower locking elements 20*a,b*. The first cone-shaped element 21*a* is fitted against the truck beam 2 by means of a conventional threaded connection 24 such that the narrow part of the first cone-shaped element 21*a* faces towards the beam 2 and the wider part of the cone-shaped element 21*a* faces towards the middle or central portion of the bracket 19, i.e. towards the wide part of the second cone-shaped element 21*b*, in the fitted state of the bracket 19, this second cone-shaped element 21*b* being fitted to the unit which is to be fastened to the vehicle's beam 2, here depicted schematically as a fuel tank (broken line) 22. The second cone-shaped element 21*b* is likewise fitted with the narrow part facing towards the fuel tank 22 and the wider part facing towards the middle or central portion of the bracket 19. The upper and lower locking elements 20*a,b* are provided with cone-shaped recesses 23 and are situated above and below the two cone-shaped elements 21*a,b*. When the upper and lower locking elements 20*a,b* with screws or bolts 25 are screwed into the two cone-shaped elements 21*a,b* the two cone-shaped elements 21*a,b* are clamped to one another and held firmly in that state.

A bracket 3, 19 according to the invention makes it possible to quickly fit units of various kinds on, for example, trucks from above and to remove those units from below in cases where superstructures prevent access from above or where dismantling from below is a market requirement.

The above description is primarily intended to make the invention easier to understand. The invention is of course therefore not confined merely to the embodiments indicated, as other variants of it are also possible and conceivable within the scope of the concept of the invention and the protective scope of the claims set out below.

Thus it is conceivable that ordinary screws without cone-shaped ends might also be used as locking elements for locking the bracket parts to one another.

As well as metal, the various parts of the brackets may of course also be made of, for example, synthetic material, e.g. plastics or the like.

The invention claimed is:

1. A suspension device for releasable fitting of a first device to a second device, the suspension device comprising:
    a first bracket part mounted on the first device and a second bracket part mounted on the second device, and at least a first and a second locking element connecting the first and second bracket parts to each other;
    wherein the first locking element is located and configured to be activated from a first side of the first and second bracket parts and the second locking element is located and configured to be activated from a second side of the first and second bracket parts;
    the bracket parts are so located and configured and the locking elements are so located and configured that only one of the first and second locking elements need be operated to release the first and second bracket part; and
    the first and second locking elements are not part of the second bracket part.

2. A suspension device for releasable fitting of a first device to a second device, the suspension device comprising:
    a first bracket part mounted on the first device and a second bracket part mounted on the second device, and at least a first and a second locking element connecting the first and second bracket parts to each other;
    wherein the first locking element is located and configured to be activated from a first side of the first and second bracket parts and the second locking element is located and configured to be activated from a second side of the first and second bracket parts;
    the bracket parts are so located and configured and the locking elements are so located and configured that only one of the first and second locking elements need be operated to release the first and second bracket parts; and
    the first device comprises a beam on a vehicle and the second device comprises a silencer, a tank or another device being configured to be connected to the beam via the suspension device.

3. A suspension device according to claim 1, wherein the first locking element is so attached to the first device and is so configured that the first locking element is activated from above the suspension device and the second locking element is so attached to the first device and is so configured that the second locking element is activated from below the suspension device.

4. A suspension device for releasable fitting of a first device to a second device, the suspension device comprising:
    a first bracket part mounted on the first device and a second bracket part mounted on the second device, and at least a first and a second locking element connecting the first and second bracket parts to each other;
    wherein the first locking element is located and configured to be activated from a first side of the first and second bracket parts and the second locking element is located and configured to be activated from a second side of the first and second bracket parts;
    the bracket parts are so located and configured and the locking elements are so located and configured that only one of the first and second locking elements need be operated to release the first and second bracket parts; and the locking elements are cone-shaped.

5. A suspension device according to claim 1, wherein each of the locking elements is located and configured when in an activated state to form a clamping connection fixing the first and second bracket parts to one another.

6. A suspension device according to claim 3, wherein the first device comprises a beam on a vehicle and the second device comprises a device for the vehicle.

7. A suspension device according to claim 1, wherein each of the first and second bracket parts has a first end and a second end, the first locking element being at the first ends of the first and second bracket parts and the second locking element being at the second ends of the first and second bracket parts;

the first device having a first connection region at which the first locking element connects the first connection region to the first ends of the bracket parts, and the first device having a second connection region at which the second locking element connects the second connection region to the second end of the bracket.

8. A suspension device according to claim 7, wherein the first and second locking elements are cone-shaped, and the first and second connection regions are shaped to cooperate with the cone shaped locking elements for causing connection.

9. A suspension device according to claim 7, wherein the first locking element is so attached to the first device and is so configured that the first locking element is activated from above the suspension device and the second locking element is so attached to the first device and is so configured that the second locking element is activated from below the suspension device.

* * * * *